United States Patent
Sawai

(10) Patent No.: US 9,248,877 B1
(45) Date of Patent: Feb. 2, 2016

(54) VEHICLE

(71) Applicant: Yamaha Hatsudoki Kabushiki Kaisha, Iwata-shi, Shizuoka (JP)

(72) Inventor: Seiji Sawai, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/483,179

(22) Filed: Sep. 11, 2014

(51) Int. Cl.
*B62D 63/04* (2006.01)
*B62D 21/00* (2006.01)
*B62D 7/22* (2006.01)

(52) U.S. Cl.
CPC *B62D 63/04* (2013.01); *B62D 7/22* (2013.01); *B62D 21/00* (2013.01); *B60G 2204/128* (2013.01)

(58) Field of Classification Search
CPC .......... B62D 63/04; B62D 21/00; B62D 7/22; B60G 2204/128
See application file for complete search history.

(56) References Cited

U.S. PATENT DOCUMENTS

| | | | |
|---|---|---|---|
| 5,098,116 A * | 3/1992 | Edahiro et al. | 280/5.524 |
| 5,553,911 A * | 9/1996 | Bodin et al. | 296/190.07 |
| 5,918,692 A * | 7/1999 | Sekita et al. | 180/56 |
| 5,921,578 A * | 7/1999 | Sekita et al. | 280/788 |
| 5,954,352 A * | 9/1999 | Rumpel et al. | 280/124.134 |
| 6,206,460 B1 * | 3/2001 | Seeliger et al. | 296/204 |
| 6,595,533 B2 * | 7/2003 | Sawai et al. | 280/124.108 |
| 7,497,510 B2 * | 3/2009 | Bunsmann et al. | 296/204 |
| 7,604,247 B2 * | 10/2009 | Kondou | 280/124.109 |
| 7,798,564 B2 * | 9/2010 | Doi et al. | 296/193.07 |
| 7,845,661 B2 * | 12/2010 | Kondou et al. | 280/124.108 |
| 7,891,728 B2 * | 2/2011 | Westing et al. | 296/204 |
| 8,047,587 B2 * | 11/2011 | Sawai | 293/117 |
| 2004/0056446 A1 * | 3/2004 | Dudding et al. | 280/124.128 |
| 2004/0124604 A1 | 7/2004 | Takano | |
| 2007/0107964 A1 * | 5/2007 | Bunsmann et al. | 180/165 |
| 2008/0309039 A1 * | 12/2008 | Bailey et al. | 280/47.34 |
| 2011/0239899 A1 * | 10/2011 | Okubo et al. | 105/185 |
| 2011/0271868 A1 * | 11/2011 | Kurahashi et al. | 105/141 |
| 2012/0017800 A1 * | 1/2012 | Kurahashi et al. | 105/182.1 |
| 2012/0048139 A1 * | 3/2012 | Okubo et al. | 105/182.1 |
| 2014/0261061 A1 * | 9/2014 | Chu et al. | 105/96 |

FOREIGN PATENT DOCUMENTS

JP 2004-099013 A 4/2004

* cited by examiner

*Primary Examiner* — Drew Brown
(74) *Attorney, Agent, or Firm* — Keating and Bennett, LLP

(57) ABSTRACT

A vehicle includes a vehicle body frame, a power unit supported by the vehicle body frame, a steering system supported by the vehicle body frame, a pair of driving wheels spaced apart from each other in a vehicle width direction, a transmission unit that transmits a driving force generated by the power unit to the pair of driving wheels and causes the pair of driving wheels to always rotate at the same rotation speed, and a vehicle body vibration control damper extending between a first portion and a second portion spaced apart from each other, each of the first portion and the second portion being located on the vehicle body frame or a member fixed to the vehicle body frame, and generating a damping force relative to the vibration that changes a distance between the first portion and the second portion.

10 Claims, 13 Drawing Sheets

//www.google.com/# VEHICLE

BACKGROUND OF THE INVENTION

1. Field of the Invention

The present invention relates to a vehicle.

2. Description of the Related Art

Japanese Patent Laid-open Publication No. 2004-99013 discloses a technique for mounting a vehicle body vibration control damper so as to extend between predetermined portions of a vehicle body frame of a motorcycle.

Some vehicles, such as a ROV (Recreational Off highway Vehicle) or the like adapted to running on an uneven ground, do not have a differential gear that causes a difference in the rotation speed when the vehicle turns between a pair of driving wheels spaced apart from each other in the vehicle width direction. In such a vehicle, the pair of driving wheels always rotate at the same rotation speed.

This may possibly cause unique vibration to be generated in the vehicle body frame when the vehicle turns due to the pair of driving wheels always rotating at the same speed.

SUMMARY OF THE INVENTION

Preferred embodiments of the present invention provide a vehicle that attenuates vibration generated in a vehicle body frame due to a pair of driving wheels always rotating at a same rotation speed.

A vehicle according to a preferred embodiment of the present invention includes a vehicle body frame, a power unit supported by the vehicle body frame, a steering system supported by the vehicle body frame, a pair of driving wheels spaced apart from each other in the vehicle width direction, a transmission unit that transmits a driving force generated by the power unit to the pair of driving wheels and causes the pair of driving wheels to always rotate at the same rotation speed, and a vehicle body vibration control damper is configured to extend between a first portion and a second portion spaced apart from each other, each of the first portion and the second portion being located on the vehicle body frame or a member fixed to the vehicle body frame, and to generate a damping force relative to the vibration that changes the distance between the first portion and the second portion.

According to various preferred embodiments of the present invention, it is possible to attenuate vibration of a vehicle body frame due to a pair of driving wheels always rotating at the same rotation speed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings.

Figure 1:
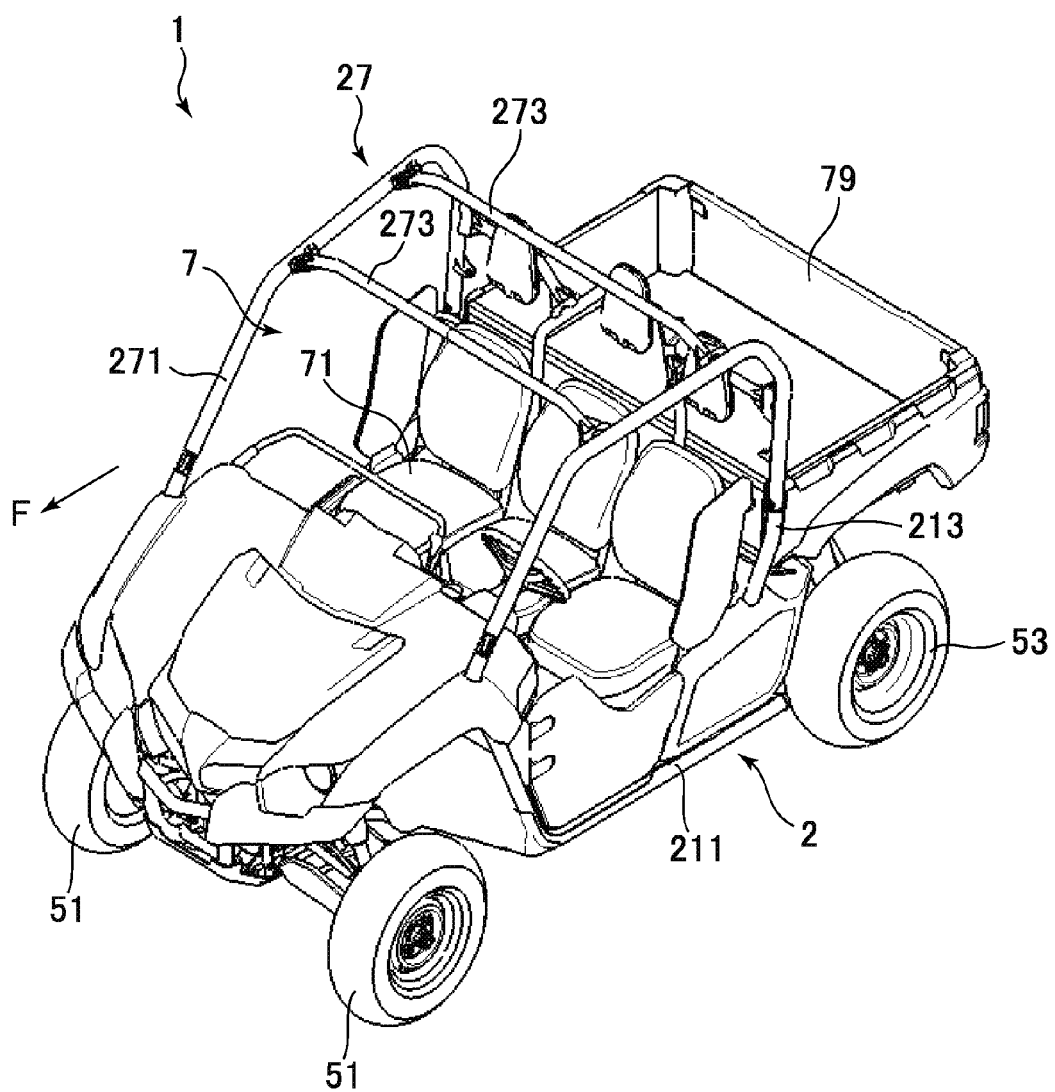
FIG. 1 is a perspective view of a vehicle according to a preferred embodiment of the present invention.
Figure 2:
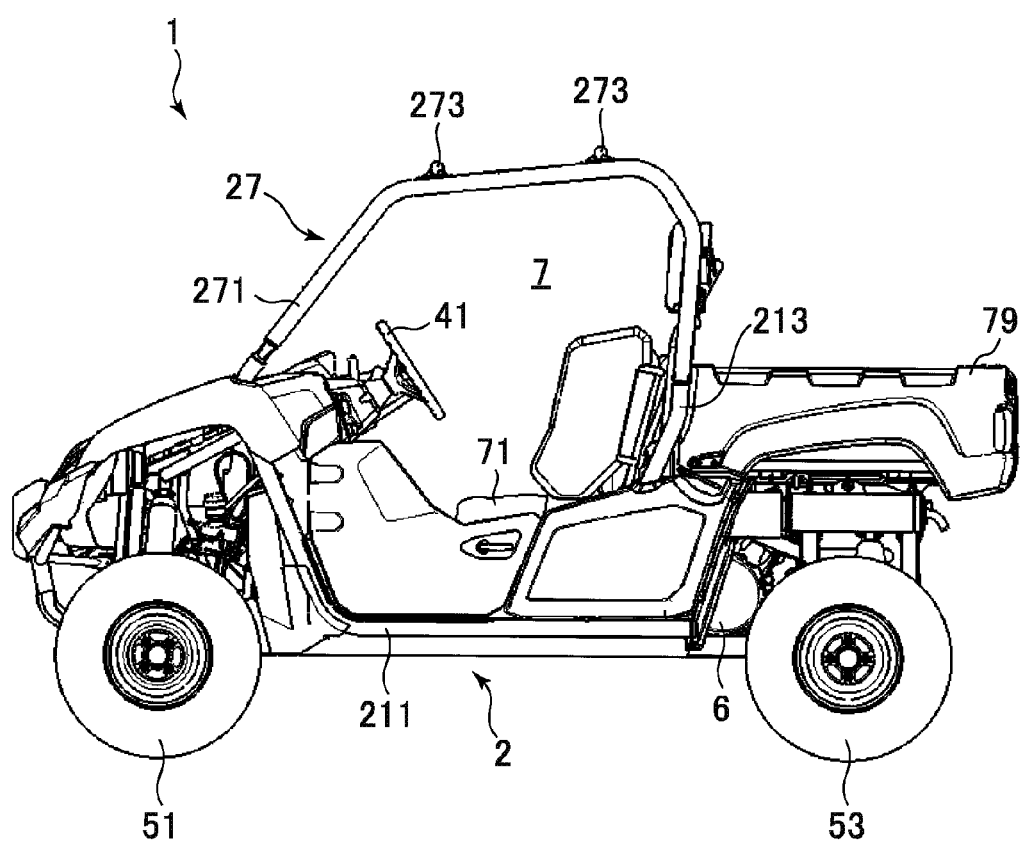
FIG. 2 is a side view of the vehicle.
Figure 3:
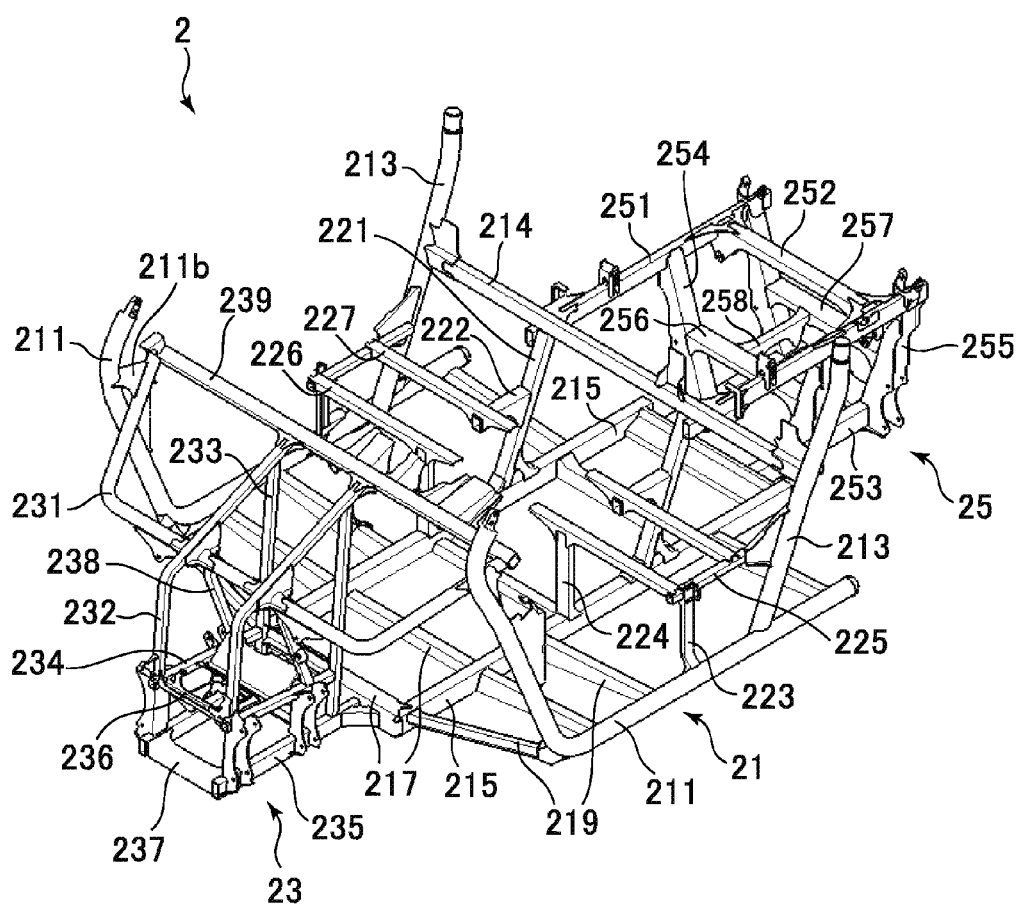
FIG. 3 is a perspective view of a vehicle body frame.
Figure 4:
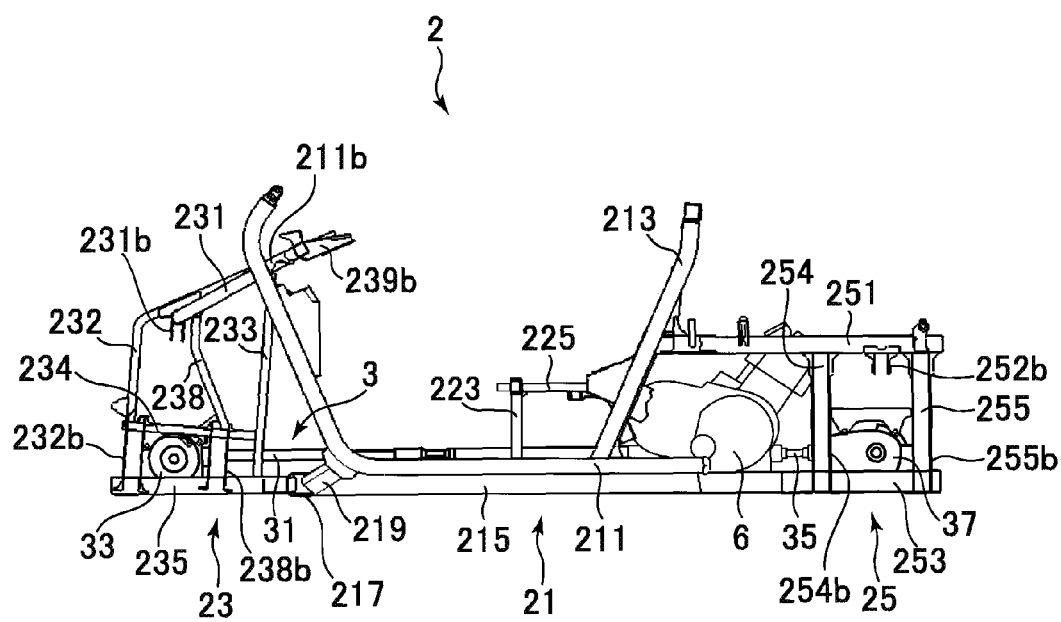
FIG. 4 is a side view of the vehicle body frame, an engine unit, and a transmission unit.
Figure 5:
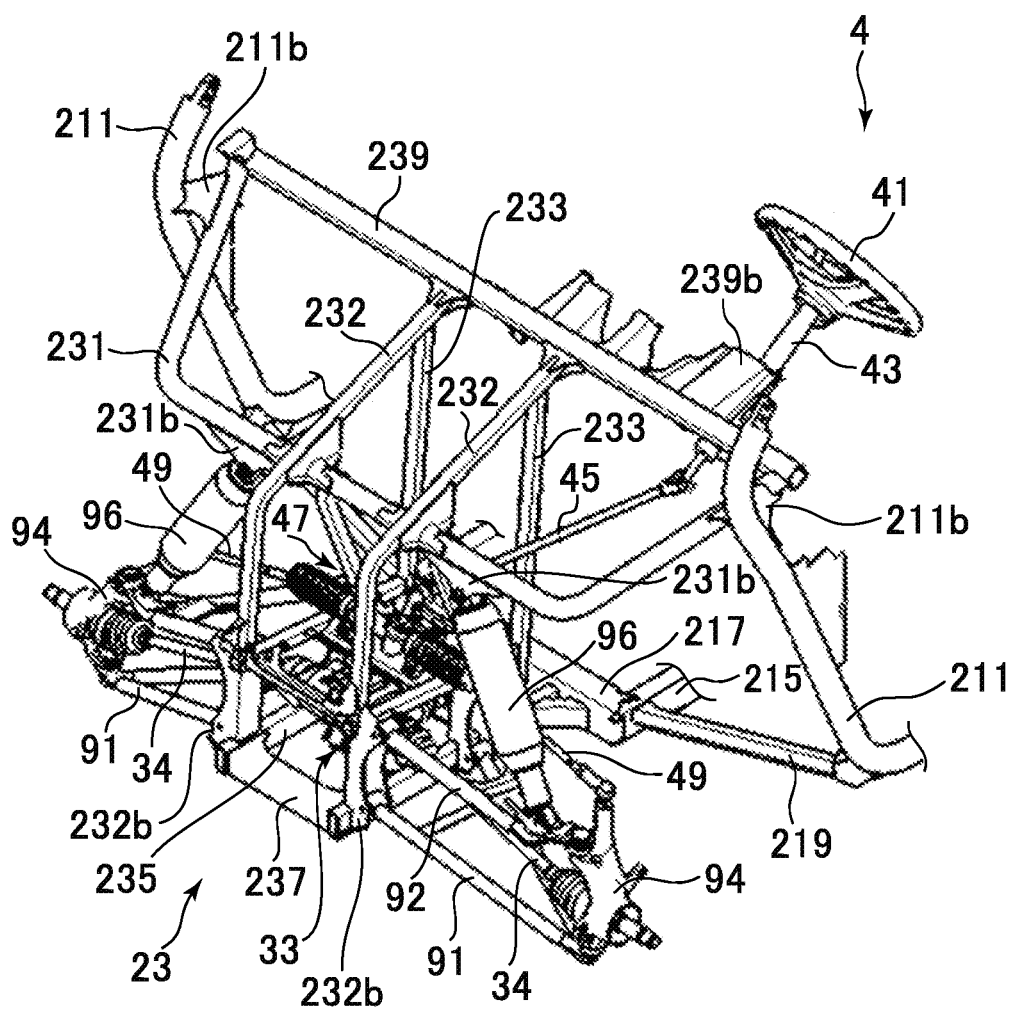
FIG. 5 is a perspective view of a front portion of the vehicle body frame and a steering system.
Figure 6:
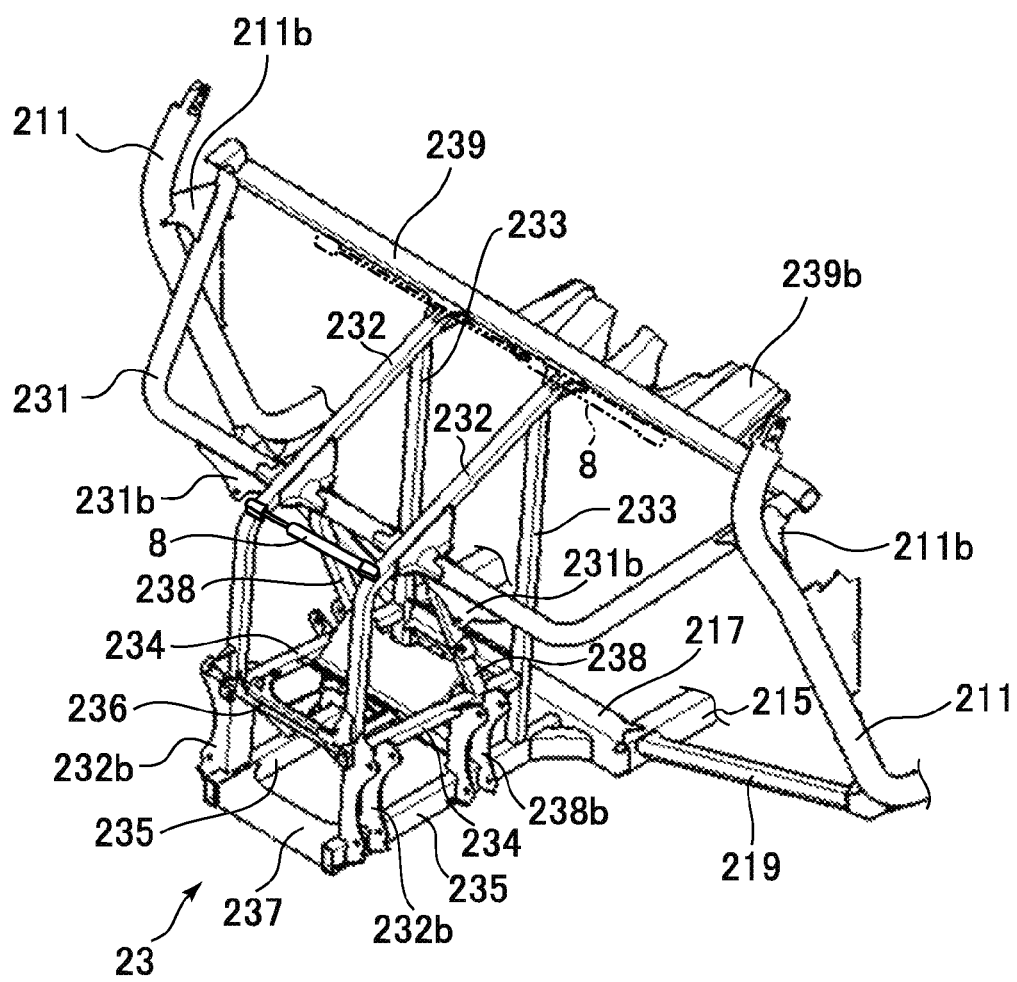
FIG. 6 is a perspective view of the front portion of the vehicle body frame and a vehicle body vibration control damper.
Figure 7:
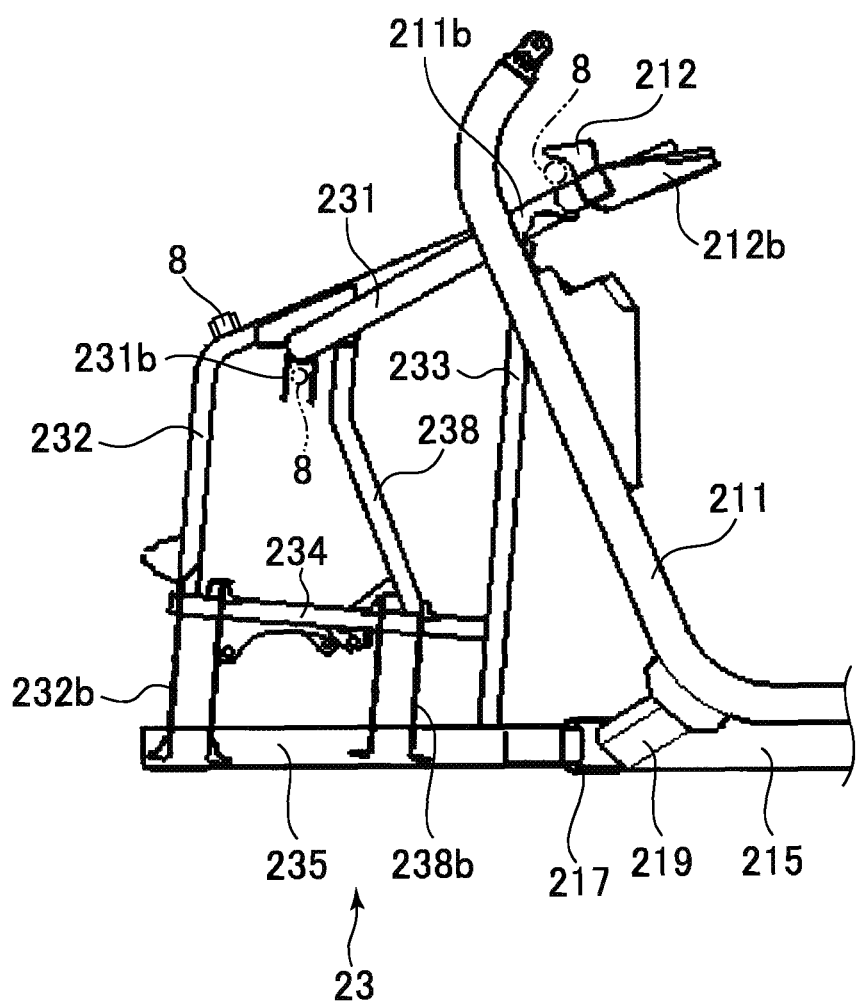
FIG. 7 is a side view of the front portion of the vehicle body frame and the vehicle body vibration control damper.
Figure 8:
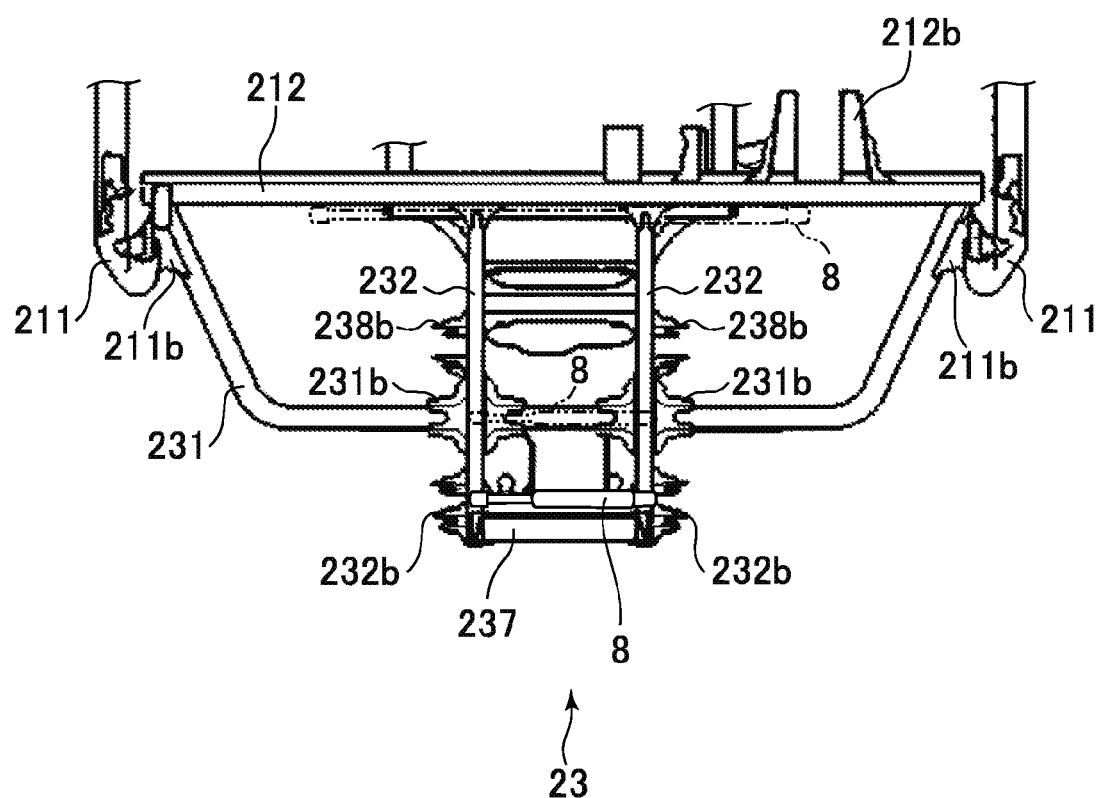
FIG. 8 is a plan view of the front portion of the vehicle body frame and the vehicle body vibration control damper.
Figure 9:
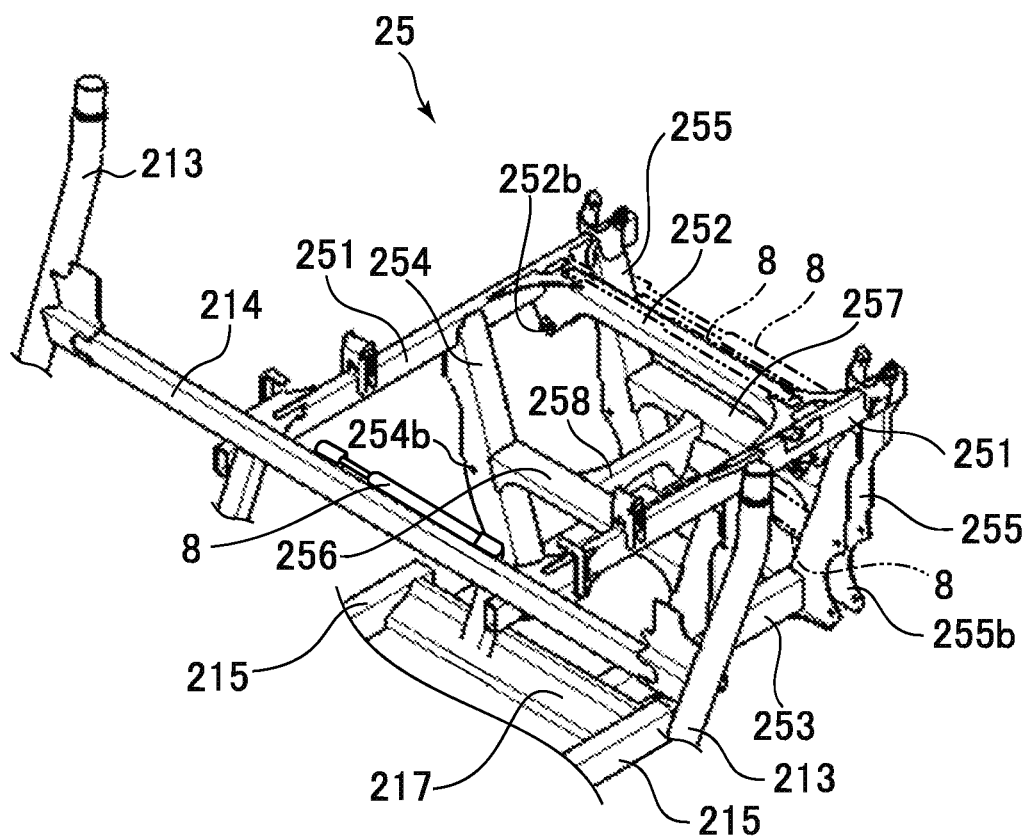
FIG. 9 is a perspective view of a rear portion of the vehicle body frame and the vehicle body vibration control damper.
Figure 10:
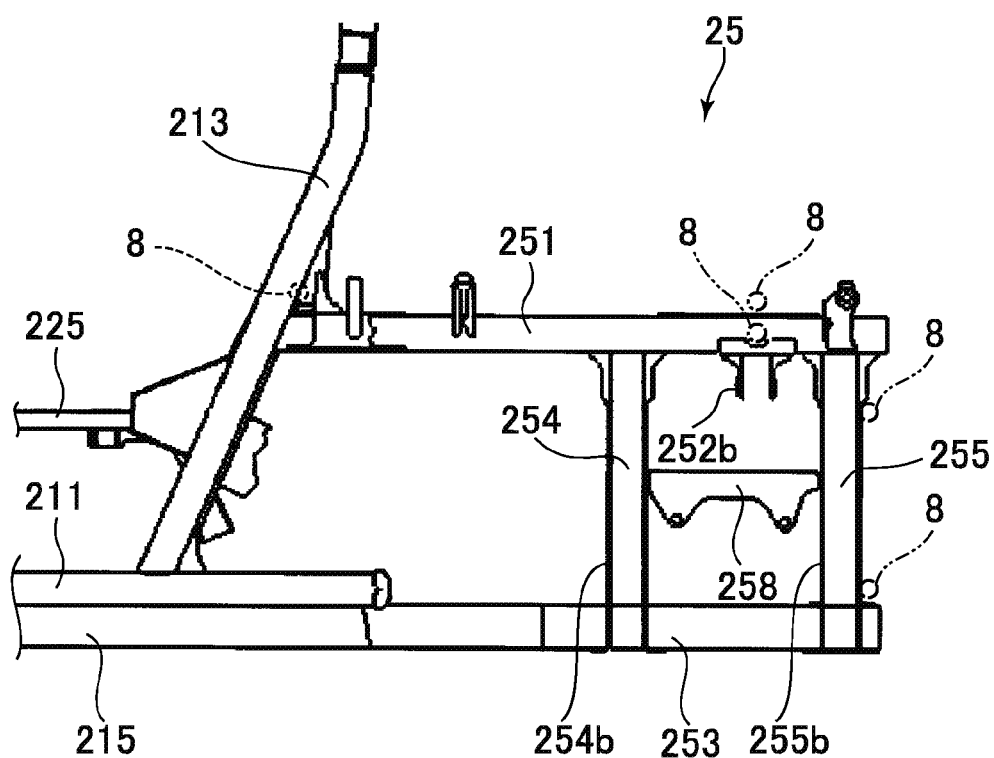
FIG. 10 is a side view of the rear portion of the vehicle body frame and the vehicle body vibration control damper.
Figure 11:
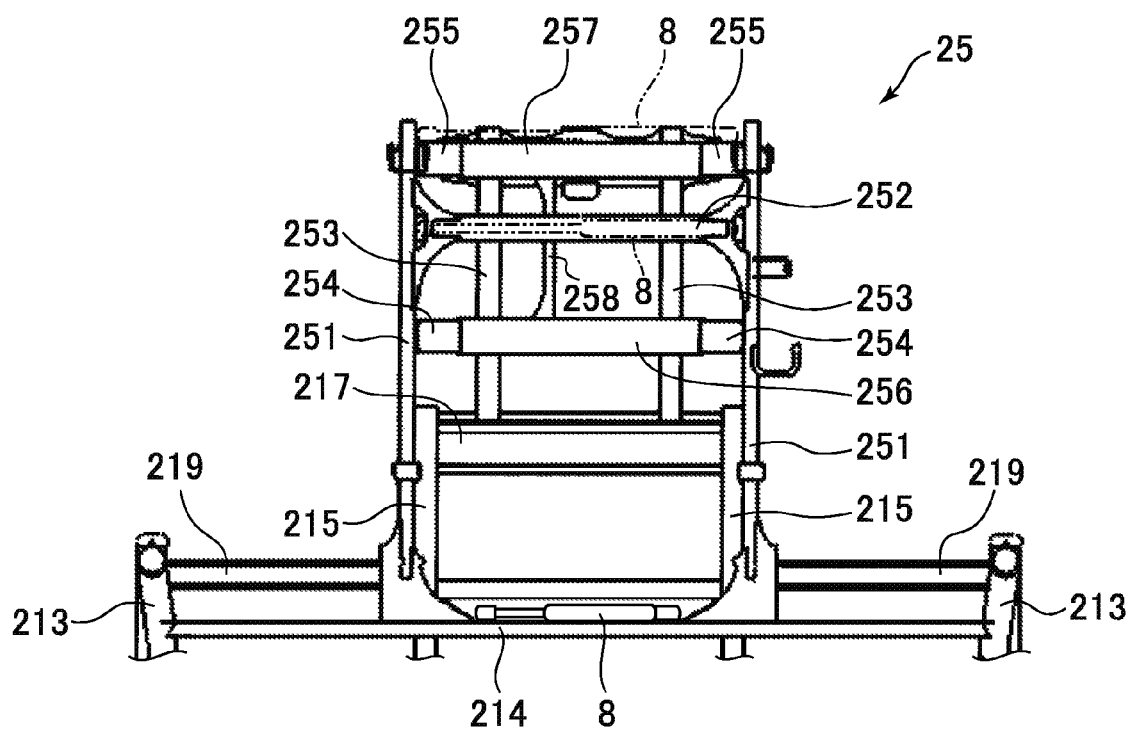
FIG. 11 is a plan view of the rear portion of the vehicle body frame and the vehicle body vibration control damper.

FIGS. 1 and 2 are a perspective view and a side view of a vehicle 1 according to a preferred embodiment of the present invention. FIG. 3 is a perspective view of a vehicle body frame 2. FIG. 4 is a side view of the vehicle body frame 2, a transmission unit 3, and an engine unit 6. FIG. 5 is a perspective view of a front portion 23 of the vehicle body frame 2 and a steering system 4. FIGS. 6 to 8 are a perspective view, a side view, and a plan view of the front portion 23 of the vehicle body frame 2 and a vehicle body vibration control damper 8. FIGS. 9 to 11 are a perspective view, a side view, and a plan view of a rear portion 25 of the vehicle body frame 2 and the vehicle body vibration control damper 8.

In the description below, the forward direction, the rearward direction, the upward direction, the downward direction, the leftward direction, and the rightward direction refer to the forward direction, the rearward direction, the upward direction, the downward direction, the leftward direction, and the rightward direction, respectively, viewed from a driver sitting on the seat 71 with the face directed to the steering wheel 41. The arrow F in FIG. 1 indicates the forward direction.

A vehicle 1 according to one preferred embodiment of the present invention preferably is, for example, a ROV (Recreational Off highway Vehicle) adapted to running on an uneven ground.

As shown in FIGS. 1 and 2, a pair of front wheels 51 are mounted in a lower front portion of the vehicle 1 so as to be spaced apart from each other in the left-right direction, that is, the vehicle width direction, while a pair of rear wheels 53 are mounted in a lower rear portion of the same so as to be spaced apart from each other in the left-right direction. These front wheels 51 and rear wheels 53 are driving wheels that transmit to the ground a driving force generated by the engine unit 6 as an example of a power unit.

A plurality of seats 71 are arranged side by side in the left-right direction in the middle of the vehicle 1 in the front-back direction. A steering wheel 41 is mounted ahead of the leftmost seat 71. A luggage rack 79 is mounted behind the plurality of seats 71.

The vehicle 1 includes a vehicle body metal frame 2, of which detailed structure is to be described later. A roof frame 27, or a portion of the vehicle body frame 2, is mounted above the seats 71 and the steering wheel 41. The roof frame 27 covers a cabin 7, which is a space that accommodates an occupant.

As shown in FIG. 4, the vehicle body frame 2 supports the transmission unit 3 that transmits a driving force generated by the engine unit 6 to the front wheels 51 and the rear wheels 53.

The transmission unit 3 includes a propeller shaft 31 extending forward from the engine unit 6, and axle shafts 34 extending in the left-right direction from the front portion 23 of the vehicle frame 2 and connected to the respective front wheels 51 (see FIG. 5), and a universal joint 33 that connects the propeller shaft 31 and the axle shafts 34.

The transmission unit 3 further includes a propeller shaft 35 extending rearward from the engine unit 6, axle shafts (not shown) extending in the left-right direction from the rear portion 25 of the vehicle frame 2 and connected to the respective rear wheels 53, and an universal joint 37 that connects the propeller shaft 35 and the axle shafts.

In this preferred embodiment, the transmission unit 3 preferably does not have a differential gear that causes a difference in the rotation speed between an inside wheel and an outside wheel when the driving wheels (the front wheels 51 and the rear wheels 53) turn. Accordingly, the left and right driving wheels always rotate at the same rotation speed. However, the transmission unit 3 may include a differential gear configured to switch between a locked state and an unlocked state. When the differential gear is locked, the left and right driving wheels always rotate at the same rotation speed.

As shown in FIG. 5, the steering system 4 is supported in the front portion 23 of the vehicle body frame 2. The steering system 4 includes the steering wheel 41, a steering column 43, a middle shaft 45, a steering gear 47, and steering arms 49.

Uprights 94 that support the respective front wheels 51 are mounted on the right and left respective sides in the front portion 23 of the vehicle body frame 2. A lower arm 91, an upper arm 92, and a suspension 96 are provided between the front portion 23 of the vehicle body frame 2 and each upright 94. This is similarly applicable to the rear wheels 53. Each steering arm 49 is connected to the upright 94.

In the following, a detailed structure of the vehicle body frame 2 will be described.

In this preferred embodiment, the vehicle body frame 2 includes a metal pipe preferably made of iron or steel, for example. However, the vehicle body frame 2 may be made of aluminum or aluminum alloy extrusion, instead of a metal pipe made of iron or steel.

As shown in FIGS. 3 to 11, the vehicle body frame 2 includes a main portion 21, the front portion 23, located ahead of the main portion 21, and the rear portion 25, located behind the main portion 21.

The main portion 21 of the vehicle body frame 2 includes a pair of left and right cabin frames 211, 213 positioned at an outermost location in the left-right direction. Each cabin frame 211 extends in the front-back direction between the front wheel 51 and the rear wheel 53. The front portion of the cabin frame 211 extends forward and upward, of which tip end is curved toward the rear. The cabin frame 213 is connected to the rear portion of the cabin frame 211, and extends rearward and upward. A cross frame 214 is arranged to extend in the left-right direction between the middle positions of the respective cabin frames 213 in the up-down direction. The cabin frames 211, 213 are each preferably made of a metal pipe having a round cross section. The cross frame 214 is preferably made of a metal pipe having a rectangular or substantially rectangular cross section.

A roof frame 27 is mounted above the cabin frames 211, 213 (see FIGS. 1 and 2). The roof frame 27 includes a pair of left and right cabin frames 271 connected to the upper ends of the respective cabin frames 211, 213, and a plurality of cross frames 273 extending between the cabin frames 271. The space enclosed by the cabin frames 211, 213, 271 in a side view is defined as the cabin 7. The cabin frame 271 and the cross frame 273 are each preferably made of a metal pipe having a round cross section.

The main portion 21 of the vehicle body frame 2 further includes a pair of left and right support frames 215 positioned between the cabin frames 211 and extending in the front-back direction, a plurality of cross bars 217 extending between the support frames 215, and a plurality of cross bars 219 extending between the cabin frame 211 and the support frame 215. The support frame 215 is preferably made of a metal pipe having a rectangular or substantially rectangular cross section. The engine unit 6 is supported on the support frames 215 in a position more rearward than the cabin frame 213.

A seat bar 225 is connected to the cabin frame 213 at a position lower than the cross frame 214, and extends in the front-back direction. Columns 221 are provided between the cross frame 214 and the respective support frames 215. A bracket 222 is mounted at the middle position of each column 221 in the vertical direction, and projects forward. A seat bar 227 is configured to extend between the seat bar 225 and the bracket 222, and extend in the left-right direction.

A column 223 is connected to each cabin frame 211 at a position more forward than the cabin frame 213, and extend in the up-down direction. A column 224 is connected to each support frame 215 at a position more forward than the column 221, and extend in the up-down direction. A seat bar 226 is arranged to extend in the left-right direction between the upper end portions of the respective columns 223, 224. The seat 71 is mounted on the seat bars 223, 224, 225.

The front portion 23 of the vehicle body frame 2 includes front frames 231 connected to the upper front portions of the pair of left and right respective cabin frames 211 via respective brackets 211b. Each front frame 231 has an arc shape that extends forward and downward from the upper front portion of the cabin frame 211. A cross bar 239 is arranged to extend in the left-right direction between the rear end portions of the respective front frames 231. A bracket 239b that supports the steering column 43 is mounted on the cross bar 239. Each front frame 231 is preferably made of a metal pipe having a round cross section, and the cross bar 239 is made of a metal pipe preferably having a rectangular or substantially rectangular cross section.

The front portion 23 of the vehicle body frame 2 further includes a pair of left and right lower rails 235 extending in the front-back direction and connected to the foremost cross bar 217 extending between the support frames 215, and a cross bar 237 extending in the left-right direction between the front end portions of the respective lower rails 235.

The front portion 23 of the vehicle body frame 2 further includes a pair of left and right columns 232 extending between the middle of the cross bar 239 in the left-right direction and the respective front end portions of the lower rails 235 and being bent at an obtuse angle, and a pair of left and right columns 233 extending in the up-down direction between the respective upper end portions of the columns 232 and the respective rear portions of the lower rails 235. Each column 232 is connected also to the front frame 231, and extends forward and downward between the cross bar 239 and the front frame 231 and in the up-down direction between the front frame 231 and the lower rail 235.

The front portion 23 of the vehicle body frame 2 further includes a pair of left and right upper rails 234 provided above the lower rails 235 and each extending in the front-back direction between the columns 232, 233, and a cross bar 237 extending in the left-right direction between the front end portions of the respective upper rails 234. Further, the front portion 23 of the vehicle body frame 2 includes columns 238 each extending forward and upward between the column 232 and the upper rail 234.

Brackets 232b, 238b that support the lower arms 91 and the upper arms 92 are mounted between the lower rails 235 and the upper rails 234 so as to be spaced apart from each other in the front-back direction. Further, brackets 231b that support the respective suspensions 96 are mounted on the front frame 231 each at a position outside in the left-right direction the position where the column 232 is connected to the front frame 231.

The rear portion 25 of the vehicle body frame 2 includes a pair of left and right upper rails 251 extending in the front-back direction and connected to the cross frame 214 at the middle in the left-right direction and a pair of left and right lower rails 235 extending in the front-back direction and connected to the endmost cross bar 217 extending between the support frames 215. Further, the rear portion 25 of the vehicle body frame 2 includes a cross bar 252 extending in the left-right direction between the rear portions of the respective upper rails 251. Brackets 252b that support respective suspensions (not shown) are mounted on the cross bar 252.

The rear portion 25 of the vehicle body frame 2 further includes a pair of left and right columns 254 extending in the left-right direction between the respective middle positions of the upper rail 251 and of the lower rail 253 in the front-back direction, and a pair of left and right columns 255 extending in the up-down direction between the respective rear end portions of the upper rail 251 and of the lower rail 253. Brackets 254b, 255b that support lower arms and upper arms (not shown) are mounted on the respective columns 254, 255.

The rear portion 25 of the vehicle body frame 2 further includes a cross bar 256 extending in the left-right direction between the middle positions of the respective columns 254 in the up-down directions, a cross bar 257 extending in the left-right direction between the middle positions of the respective columns 255 in the up-down direction, and a middle rail 258 extending in the front-back direction between the cross-bars 256, 257.

In the vehicle 1 in this preferred embodiment, the transmission unit 3 preferably does not have a differential gear, and the left and right driving wheels (the front wheels 51 and the rear wheels 53) always rotate at the same speed, as described above. Therefore, in the vehicle 1 in this preferred embodiment, unique vibration due to the left and right driving wheels always rotating at the same rotation speed may possibly be generated in the vehicle body frame 2 when the vehicle turns.

That is, in the case where an outside wheel transmits a driving force while gripping a road surface when turning, an inside wheel will resultantly slip. Since resistance of a road surface is not always constant, it is considered that the inside wheel does not continue stable slipping but momentarily repeats gripping the road surface and slipping. In such a situation, a moment that momentarily repeats pushing an inside of the axle shaft 34 in the running direction and releasing the force while receiving a moment that pushes an outside of the axle shaft 32 in the running direction is transmitted from the axle shaft 34 to the vehicle body frame 2, which resultantly causes unique vibration to be generated in the vehicle body frame 2.

In view of the above, as shown in FIGS. 6 to 11, the vehicle 1 in this preferred embodiment includes a plurality of vehicle body vibration control dampers 8 configured to attenuate unique vibration generated in the vehicle body frame 2. Each of the vehicle body vibration control dampers 8 is mounted so as to extend between a first portion and a second portion spaced apart from each other of the vehicle body frame 2 and members fixed thereto, and generates a damping force relative to the vibration that changes the distance between the first portion and the second portion. Note here that a state of being fixed includes not only a state of being welded but also that of being fixed using a fastener such as a bolt or the like. In FIGS. 6 to 11, other alternatives in an arrangement of the vehicle body vibration control damper 8 are indicated by the long dashed double-short dashed line.

The vehicle body vibration control damper 8 preferably includes, for example, an oil damper with high pressure gas sealed therein. The vehicle body vibration control damper 8 preferably includes a cylinder and a piston rod that extends from the cylinder and is capable of displacement in the axial direction. Oil, high pressure gas, and a spring, for example, are sealed in the cylinder. When a piston provided to the tip end of the piston rod moves slightly in the axial direction in the cylinder, a damping force in the opposite direction is generated.

In this preferred embodiment, one of the vehicle body vibration control dampers 8 is located in the front portion 23 of the vehicle body frame 2 (see FIGS. 6 to 8), and another one of the vehicle body vibration control dampers 8 is located in the rear portion 25 of the vehicle body frame 2 (see FIGS. 9 to 11).

As shown in FIGS. 6 to 8, the vehicle body vibration control damper 8 is configured to extend between the pair of left and right columns 232 mounted in the front portion 23 of the vehicle body frame 2. Specifically, the vehicle body vibration control damper 8 is fixed, using a fastener, such as a bolt or the like, to the column 232 by fixing an attachment provided to an end portion of the vehicle body vibration control damper 8 to a projection located on the column 232 by means of welding or the like. The vehicle body vibration control damper 8 arranged as described above generates a damping force relative to the vibration that changes the distance between the pair of left and right columns 232.

Specifically, the vehicle body vibration control damper 8 is mounted on the column 232 on a bent portion thereof near the connection portion where the front frame 231 is connected to the column 232. As the bracket 231b that supports the suspension 96 is mounted near the connection portion of the front frame 231, it is possible to effectively prevent vibration transmitted from the suspension 96 to the vehicle body frame 2 by locating the vehicle body vibration control damper 8 near the connection portion of the column 232. Further, as the bracket 232b is mounted on the lower end portion of the column 232, it is possible to effectively prevent both vibration transmitted from the suspension 96 to the vehicle body frame 2 and vibration transmitted from the lower rail 235 and the upper rail 234 to the vehicle body frame 2 by locating the vehicle body vibration control damper 8 between the connection portion and the bracket 232b. Further, since stress due to vibration is likely concentrated onto the bent portion of the column 232, it is possible to prevent stress concentration onto the bent portion of the column 232 by providing the vehicle body vibration control damper 8 on the bent portion of the column 232.

The vehicle body vibration control damper 8 may be arranged to extend between a left side portion and a right side portion spaced apart from each other of the front frame 231 with the middle of the front frame 231 in the left-right direction in-between. The vehicle body vibration control damper 8 arranged as described above generates a damping force relative to the vibration that changes the distance between the left side portion and the right side portion of the front frame 231.

Specifically, the vehicle body vibration control damper 8 is arranged on the opposite side of the connection portion of the front frame 231 where the column 232 is connected to the front frame 231 between the pair of left and right brackets 231b that support the respective suspensions 96. That is, the connection portion is located on the upper surface of the front frame 231, and the vehicle body vibration control damper 8 is mounted on the lower surface of the front frame 231. Because the vehicle body vibration control damper 8 is located between the pair of left and right brackets 231b, as described above, it is possible to effectively prevent vibration transmitted from the suspensions 96 to the vehicle body frame 2. Further, as the vehicle body vibration control damper 8 is mounted on the opposite side of the connection portion, it is possible to effectively prevent vibration transmitted from the front frame 231 to the columns 232. Still further, as the vehicle body vibration control damper 8 is mounted on the front frame 231 made of a metal pipe having a relatively high elasticity coefficient, it is possible to prevent relatively strong vibration transmitted to the front frame 231.

The vehicle body vibration control damper 8 may be arranged to extend between a left side portion and a right side portion spaced apart from each other of the cross bar 239 with the middle of the cross bar 239 in the left-right direction in-between. The vehicle body vibration control damper 8 arranged as described above generates a damping force relative to the vibration that changes the distance between the left side portion and the right side portion of the cross bar 239.

Specifically, the vehicle body vibration control damper 8 is mounted on the cross bar 239 in a position farther inside than the respective both end portions of the cross bar 239 in the left-right direction where the respective front frames 231 are connected and more outside than the middle of the cross bar 239 in the left-right direction where the columns 232 are connected. With the vehicle body vibration control damper 8 is mounted as described above, it is possible to effectively prevent both vibration transmitted from the front frame 231 to the cross bar 239 and vibration transmitted from the columns 232 to the cross bar 239. Further, because a bracket 239b that supports the steering column 43 is mounted on the cross bar 239, it is possible to effectively prevent vibration transmitted from the cross bar 239 to the steering wheel 41 by providing the vehicle body vibration control damper 8 on the cross bar 239. Further, it is possible to prevent relatively strong vibration transmitted to the cross bar 239 by providing the vehicle body vibration control damper 8 on the cross bar 239 made of a metal pipe having a relatively high elasticity coefficient.

As shown in FIGS. 9 to 11, the vehicle body vibration control damper 8 is arranged to extend between a left side portion and a right side portion spaced apart from each other of the cross frame 214 with the middle of the cross frame 214 of the vehicle body frame 2 in the left-right direction in-between. The vehicle body vibration control damper 8 preferably is fixed to the cross frame 214 using a fastener, such as bolt or the like, for example, an attachment piece provided to an end portion of the vehicle body vibration control damper 8 to a projection located on the cross frame 214 by welding or the like. The vehicle body vibration control damper 8 arranged as described above generates a damping force relative to the vibration that changes the distance between the left side portion and the right side portion of the cross frame 214.

Specifically, the vehicle body vibration control damper 8 is mounted on the cross frame 214 in a position near the connection portion where the upper rail 251 is connected to the cross frame 214. As the vehicle body vibration control damper 8 is arranged as described above, it is possible to effectively prevent vibration transmitted from the upper rails 251 to the cross frame 214, further to the seat 71. Further, because the vehicle body vibration control damper 8 is mounted on the cross frame 214 made of a metal pipe having a relatively high electricity coefficient, it is possible to prevent relatively strong vibration from being transmitted to the cross frame 214.

The vehicle body vibration control damper 8 preferably is arranged to extend between a left side portion and a right side portion spaced apart from each other with the middle of the cross bar 252 in-between in the rear portion 25 of the vehicle body frame 2. Specifically, the vehicle body vibration control damper 8 preferably is arranged on the upper surface of the cross bar 252 or inside the U-shape that is open downward. The vehicle body vibration control damper 8 is arranged as described above so as to generate a damping force relative to the vibration that changes the distance between the left side portion and the right side portion of the cross bar 252. Because a pair of left and right brackets 252b that support suspensions (not shown) are provided to the cross bar 252, it is possible to effectively prevent vibration transmitted from the suspensions (not shown) to the crossbar 252 by arranging the vehicle body vibration control damper 8 on the cross bar 252.

The vehicle body vibration control damper 8 preferably is arranged to extend between the pair of left and right columns 255 in the rear portion 25 of the vehicle body frame 2. Specifically, the vehicle body vibration control damper 8 preferably is arranged on the rear surface of an upper portion of the column 255 near the upper rail 251 or on the rear surface of a lower portion of the column 255 near the lower rail 253. The vehicle body vibration control damper 8 arranged as described above generates a damping force relative to the vibration that changes the distance between the pair of left and right columns 255. Because a pair of left and right brackets 255b that each support a lower arm and an upper arm (not shown) are provided on the respective columns 255, it is possible to effectively prevent vibration transmitted from the lower arm and the upper arm (not shown) to the column 255 by arranging the vehicle body vibration control damper 8 on the column 255.

Although examples are described above in which the vehicle body vibration control damper 8 preferably is arranged to extend between a first portion and a second portion spaced apart from each other in the left-right direction, this is not limiting, and the vehicle body vibration control damper 8 may be arranged to extend between a first portion and a second portion spaced apart from each other in the front-back direction or between a first portion and a second portion spaced apart from each other in the left-right direction and also in the front-back direction.

Figure 12:
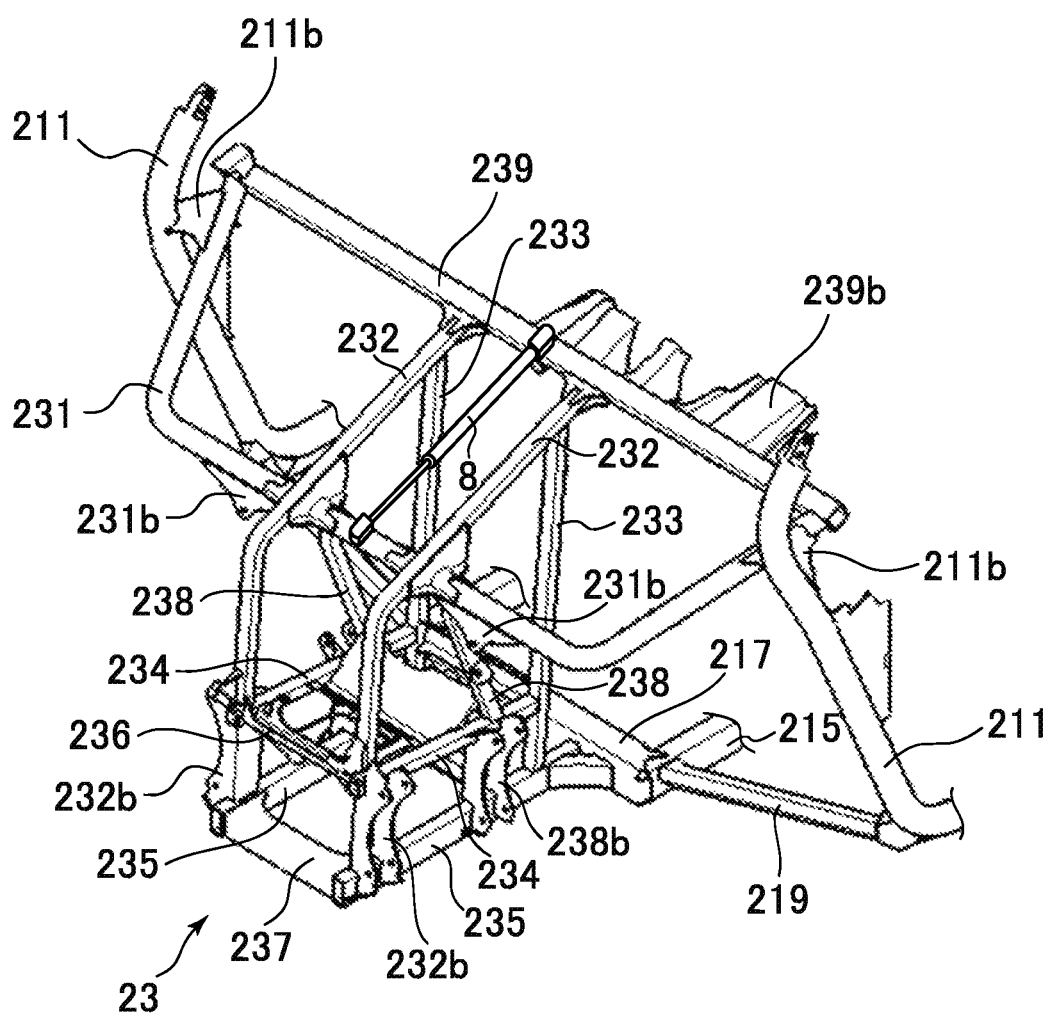
FIG. 12 shows a modified example according to a preferred embodiment of the present invention of an arrangement of the vehicle body vibration control damper.
Figure 13:
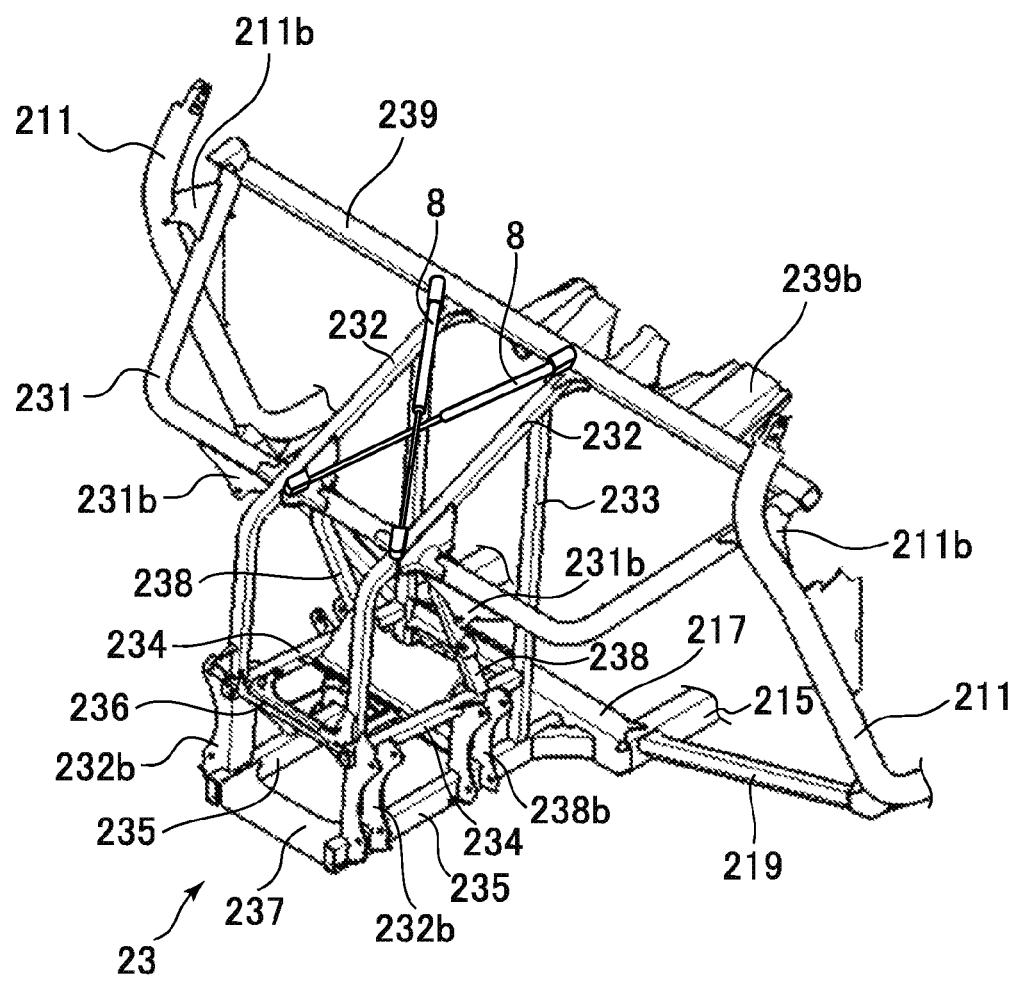
FIG. 13 shows a modified example according to a preferred embodiment of the present invention of an arrangement of the vehicle body vibration control damper.

In a modified example shown in FIG. 12, the vehicle body vibration control damper 8 is arranged to extend in the front-back direction between the middle of the front frame 231 in the left-right direction and the middle of the cross bar 239 in the left-right direction. In the modified example shown in FIG. 13, two vehicle body vibration control dampers 8 are arranged to extend in the left-right direction and the front-back direction so as to intersect each other between the front frame 231 and the cross bar 239.

Although examples are described above in which the vehicle body vibration control damper 8 preferably is mounted directly on the vehicle body frame 2, this is not limiting, and the vehicle body vibration control damper 8 may be mounted on a member fixed to the vehicle body frame 2. A member fixed to the vehicle body frame 2 may include, for example, a bumper (not shown) fixed on the front or rear surface of the vehicle body frame 2 or the luggage rack 79. The luggage rack 79 is mounted so as to rock relative to the vehicle body frame 2, and attached to at least one point with respect to each of the pair of left and right upper rails 251. Accordingly, unique vibration due to the pair of driving wheels always rotating at the same rotation speed when the vehicle turns is transmitted to the luggage rack 79 as well. Therefore, it is possible to attenuate vibration generated in the vehicle body frame by arranging the vehicle body vibration control damper 8 on the luggage rack 79 as well.

Although preferred embodiments of the present invention are described in the above, the present invention is not limited to the above described preferred embodiments, and various modified preferred embodiments are possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle, comprising:
a vehicle body frame;
a power unit supported by the vehicle body frame;
a steering system supported by the vehicle body frame;
a pair of driving wheels spaced apart from each other in a vehicle width direction;
a transmission unit configured to transmit a driving force generated by the power unit to the pair of driving wheels and to cause the pair of driving wheels to always rotate at a same rotation speed; and
a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein
the vehicle body vibration control damper includes oil, pressurized gas, and a spring sealed therein;
the first portion and the second portion are spaced apart from each other in a vehicle front-back direction;
the vehicle body frame includes a metal pipe;
the vehicle body frame includes a cabin frame that constitutes a portion of a cabin configured to be occupied by an occupant of the vehicle; and
at least a portion of the cabin frame includes the metal pipe.

2. The vehicle according to claim 1, wherein
the vehicle body frame includes a pair of left and right first and second support frames that extend in the vehicle front-back direction and support the power unit; and
the first and second support frames each include a metal pipe.

3. The vehicle according to claim 1, wherein
the cabin frame includes a roof frame that constitutes an upper portion of the cabin and is mounted in a removable manner; and
the first portion and the second portion are portions of the vehicle body frame excluding the roof frame.

4. The vehicle according to claim 1, wherein the first portion and the second portion are also spaced apart from each other in the vehicle width direction.

5. A vehicle, comprising:
a vehicle body frame;
a power unit supported by the vehicle body frame;
a steering system supported by the vehicle body frame;
a pair of driving wheels spaced apart from each other in a vehicle width direction;
a transmission unit configured to transmit a driving force generated by the power unit to the pair of driving wheels and to cause the pair of driving wheels to always rotate at a same rotation speed; and
a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein
the vehicle body frame includes:
a pair of columns spaced apart from each other in the vehicle width direction, each of the pair of columns extending in a vehicle front-back direction and including a bent portion and a portion extending downward;
a front frame extending in the vehicle width direction and connected to the pair of columns behind the bent portions;
a pair of upper brackets spaced apart from each other in the vehicle width direction, mounted to the front frame, and supporting suspensions supporting a pair of front driving wheels; and
a pair of lower brackets spaced apart from each other in the vehicle width direction, mounted to the pair of columns below the bent portions, and supporting arms supporting the pair of front driving wheels; and
the bent portions are the first portion and the second portion spaced apart from each other in the vehicle width direction; and
the vehicle body vibration control damper is arranged to extend between the bent portions of the pair of columns.

6. A vehicle, comprising:
a vehicle body frame;
a power unit supported by the vehicle body frame;
a steering system supported by the vehicle body frame;
a pair of driving wheels spaced apart from each other in a vehicle width direction;
a transmission unit configured to transmit a driving force generated by the power unit to the pair of driving wheels and to cause the pair of driving wheels to always rotate at a same rotation speed; and
a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein
the vehicle body frame includes:
a pair of columns spaced apart from each other in the vehicle width direction, each of the pair of columns extending in a vehicle front-back direction and including a bent portion and a portion extending downward;
a front frame extending in the vehicle width direction and connected to the pair of columns behind the bent portions;
a pair of upper brackets spaced apart from each other in the vehicle width direction, mounted to the front frame, and supporting suspensions supporting a pair of front driving wheels; and
a pair of lower brackets spaced apart from each other in the vehicle width direction, mounted to the pair of columns below the bent portions, and supporting arms supporting the pair of front driving wheels;

portions of the front frame located between the upper brackets are the first portion and the second portion spaced apart from each other in the vehicle width direction; and the vehicle body vibration control damper is arranged to extend between the portions of the front frame located between the upper brackets.

7. A vehicle, comprising:

a vehicle body frame;

a power unit supported by the vehicle body frame;

a steering system supported by the vehicle body frame;

a pair of driving wheels spaced apart from each other in a vehicle width direction;

a transmission unit configured to transmit a driving force generated by the power unit to the pair of driving wheels and to cause the pair of driving wheels to always rotate at a same rotation speed; and a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein the vehicle body frame includes:
- a pair of columns spaced apart from each other in the vehicle width direction, each of the pair of columns extending in a vehicle front-back direction and including a bent portion and a portion extending downward;
- a front frame extending in the vehicle width direction and connected to the pair of columns behind the bent portions, the front frame including a pair of side portions spaced apart in the vehicle width direction and extending rearward;
- a cross bar extending in the vehicle width direction and connected to rear ends of the pair of columns and rear ends of the pair of side portions of the front frame;
- a pair of upper brackets spaced apart from each other in the vehicle width direction, mounted to the front frame, and supporting suspensions supporting a pair of front driving wheels;
- a pair of lower brackets spaced apart from each other in the vehicle width direction, mounted to the pair of columns below the bent portions, and supporting arms supporting the pair of front driving wheels; and
- a bracket mounted to the cross bar and supporting a steering column;

portions of the cross bar located outward in the vehicle width direction than the rear ends of the pair of columns and inward in the vehicle width direction than the rear ends of the pair of side portions of the front frame are the first portion and the second portion spaced apart from each other in the vehicle width direction; and the vehicle body vibration control damper is arranged to extend between the portions of the cross bar located outward in the vehicle width direction than the rear ends of the pair of columns and inward in the vehicle width direction than the rear ends of the pair of side portions of the front frame.

8. A vehicle, comprising:

a vehicle body frame;

a power unit supported by the vehicle body frame;

a steering system supported by the vehicle body frame;

a pair of driving wheels spaced apart from each other in a vehicle width direction;

a transmission unit configured to transmit a driving force generated by the power unit to the pair of driving wheels and to cause the pair of driving wheels to always rotate at a same rotation speed; and a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein the vehicle body frame includes:
- a pair of upper rails spaced apart from each other in the vehicle width direction and extending in a vehicle front-back direction;
- a pair of lower rails spaced apart from each other in the vehicle width direction and extending in the vehicle front-back direction below the pair of upper rails;
- a pair of columns spaced apart from each other in the vehicle width direction, disposed between the pair of upper rails and the pair of lower rails, and extending in a vertical or substantially vertical direction;
- a pair of brackets spaced apart from each other in the vehicle width direction, mounted to the pair of columns, and supporting arms supporting a pair of rear driving wheels; and
- a cross frame extending in the vehicle width direction, disposed behind a seat, and connected to front ends of the pair of upper rails;

portions of the cross frame located between the front ends of the pair of upper rails are the first portion and the second portion spaced apart from each other in the vehicle width direction; and the vehicle body vibration control damper is arranged to extend between the portions of the cross frame located between the front ends of the pair of upper rails.

9. A vehicle, comprising:

a vehicle body frame;

a power unit supported by the vehicle body frame;

a steering system supported by the vehicle body frame;

a pair of driving wheels spaced apart from each other in a vehicle width direction;

a transmission unit configured to transmit a driving force generated by the power unit to the pair of driving wheels and to cause the pair of driving wheels to always rotate at a same rotation speed; and a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein the vehicle body frame includes:
- a pair of upper rails spaced apart from each other in the vehicle width direction and extending in a vehicle front-back direction;
- a pair of lower rails spaced apart from each other in the vehicle width direction and extending in the vehicle front-back direction below the pair of upper rails;
- a pair of columns spaced apart from each other in the vehicle width direction, disposed between the pair of upper rails and the pair of lower rails, and extending in a vertical or substantially vertical direction;

a cross bar extending in the vehicle width direction and arranged between the pair of upper rails; and a pair of brackets spaced apart from each other in the vehicle width direction, mounted to the cross bar, and supporting suspensions supporting a pair of rear driving wheels;

portions of the cross bar are the first portion and the second portion spaced apart from each other in the vehicle width direction; and the vehicle body vibration control damper is arranged to extend between the portions of the cross bar.

10. A vehicle, comprising:

a vehicle body frame;

a power unit supported by the vehicle body frame;

a steering system supported by the vehicle body frame;

a pair of driving wheels spaced apart from each other in a vehicle width direction;

a transmission unit configured to transmit a driving force generated by the power unit to the pair of driving wheels and to cause the pair of driving wheels to always rotate at a same rotation speed; and a vehicle body vibration control damper that is arranged to extend between a first portion and a second portion spaced apart from each other, each of the first portion and the second portion being located on the vehicle body frame or a member fixed to the vehicle body frame, and configured to generate a damping force relative to vibration that changes a distance between the first portion and the second portion; wherein the vehicle body frame includes:

a pair of upper rails spaced apart from each other in the vehicle width direction and extending in a vehicle front-back direction;

a pair of lower rails spaced apart from each other in the vehicle width direction and extending in the vehicle front-back direction below the pair of upper rails;

a pair of columns spaced apart from each other in the vehicle width direction, disposed between the pair of upper rails and the pair of lower rails, and extending in a vertical or substantially vertical direction; and a pair of brackets spaced apart from each other in the vehicle width direction, mounted to the pair of columns, and supporting arms supporting a pair of rear driving wheels;

the pair of columns are the first portion and the second portion spaced apart from each other in the vehicle width direction; and the vehicle body vibration control damper is arranged to extend between the pair of columns.

* * * * *